(12) United States Patent
Hong

(10) Patent No.: US 9,246,841 B2
(45) Date of Patent: Jan. 26, 2016

(54) TRANSMITTER, METHOD AND TERMINAL FOR ALLOCATING RESOURCES, AND METHOD OF RECEIVING RESOURCE ALLOCATION INFORMATION

(71) Applicant: Pantech Co., Ltd., Seoul (KR)

(72) Inventor: Sungkwon Hong, Seoul (KR)

(73) Assignee: Pantech Co., Ltd., Seoul (KR)

( * ) Notice: Subject to any disclaimer, the term of this patent is extended or adjusted under 35 U.S.C. 154(b) by 77 days.

(21) Appl. No.: 14/356,143

(22) PCT Filed: Oct. 24, 2012

(86) PCT No.: PCT/KR2012/008741
§ 371 (c)(1),
(2) Date: May 2, 2014

(87) PCT Pub. No.: WO2013/065990
PCT Pub. Date: May 10, 2013

(65) Prior Publication Data
US 2014/0307692 A1     Oct. 16, 2014

(30) Foreign Application Priority Data

Nov. 4, 2011   (KR) .......................... 10-2011-0114499
Feb. 14, 2012  (KR) .......................... 10-2012-0015040

(51) Int. Cl.
*H04L 12/911*   (2013.01)
*H04W 72/04*    (2009.01)

(52) U.S. Cl.
CPC ............... *H04L 47/70* (2013.01); *H04W 72/04* (2013.01); *H04W 72/042* (2013.01)

(58) Field of Classification Search
None
See application file for complete search history.

(56) References Cited

U.S. PATENT DOCUMENTS

| 2009/0316814 | A1* | 12/2009 | Seo | ........................ H04L 5/0007 375/260 |
| 2010/0040001 | A1 | 2/2010 | Montojo et al. | |
| 2011/0122830 | A1 | 5/2011 | Dai et al. | |
| 2011/0134861 | A1 | 6/2011 | Seo et al. | |
| 2012/0275413 | A1 | 11/2012 | Hong et al. | |

FOREIGN PATENT DOCUMENTS

| KR | 10-0921467 | 10/2009 |
| KR | 10-2010-0019336 | 2/2010 |
| KR | 10-2011-0050674 | 5/2011 |
| KR | 10-2011-0081017 | 7/2011 |

OTHER PUBLICATIONS

International Search Report submitted with International Application PCT/KR2012/008741 dated Feb. 28, 2013.

* cited by examiner

*Primary Examiner* — Ashley Shivers
(74) *Attorney, Agent, or Firm* — H.C. Park & Associates, PLC

(57) ABSTRACT

The present invention relates to resource allocation in a wireless communication system. Specifically, the method comprises: an encoding step in which a resource block or a resource block group generates a resource indication value (RIV) which is a transform of the length (L) and the offset (j) of a contiguous resource allocation region; and a transmission step in which the resource allocation information is transmitted to a terminal, wherein the resource allocation information is calculated by means of a prescribed mathematical equation.

8 Claims, 16 Drawing Sheets

FIG.5
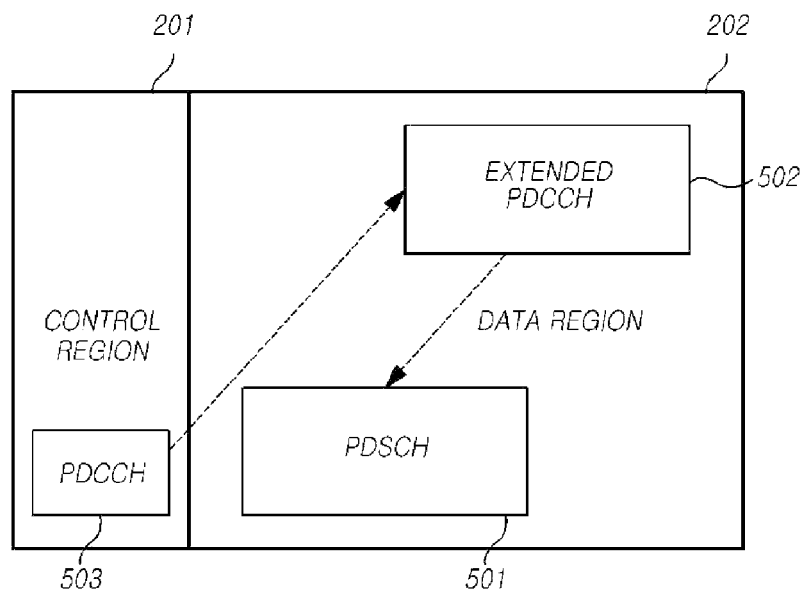
(A)
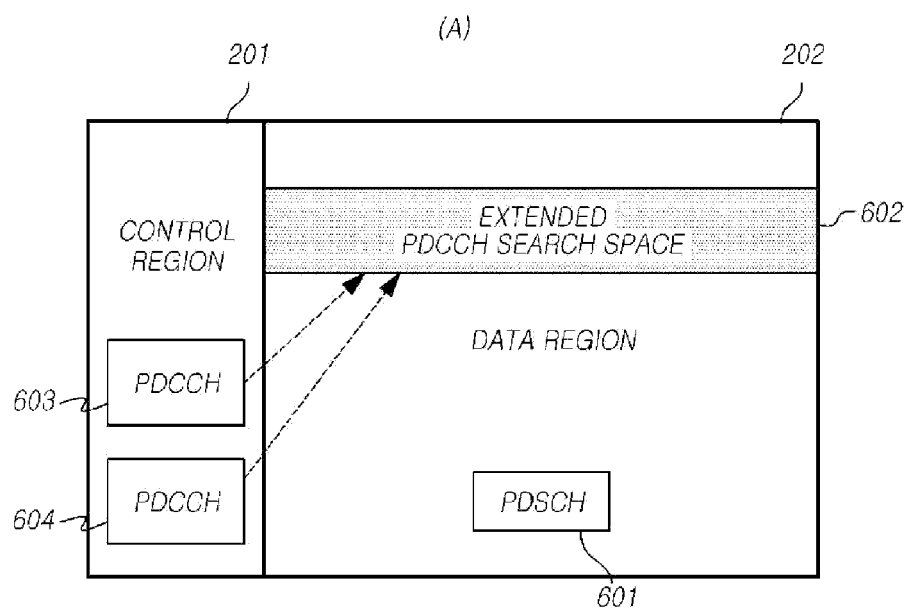
(B)

FIG. 6
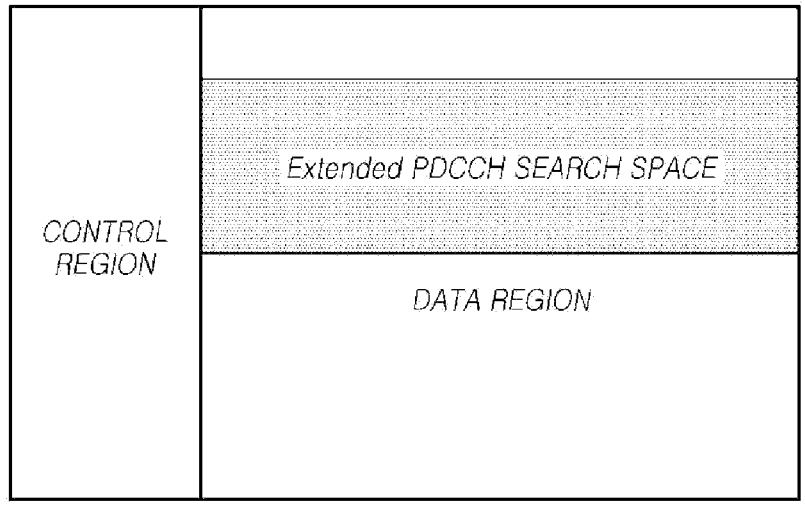
(A) LOCALIZED CONFIGURATION
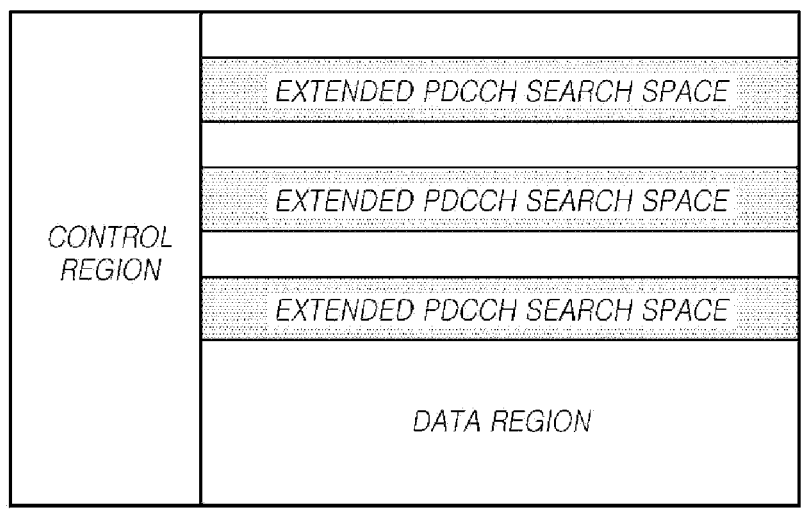
(B) DISTRIBUTIVE CONFIGURATION TRANSMITTER, METHOD AND TERMINAL FOR ALLOCATING RESOURCES, AND METHOD OF RECEIVING RESOURCE ALLOCATION INFORMATION

CROSS-REFERENCE TO RELATED APPLICATIONS

This application is the National Stage Entry of International Application No. PCT/KR2012/008741, filed on Oct. 24, 2012 and claims priority from and the benefit of Korean Patent Application No. 10-2011-0114499, filed on Nov. 4, 2011 and Korean Patent Application No. 10-2012-0015040, filed on Feb. 14, 2012, all of which are hereby incorporated by reference for all purposes as if fully set forth herein.

BACKGROUND

Field

The present invention relates to resource allocation in a wireless communication system.

DISCUSSION OF THE BACKGROUND

In a wireless communication system, one of the basic principles of wireless access may be shared channel transmission, that is, dynamic sharing of time-frequency resources among user equipments. To achieve the above, a base station may control allocation of uplink and downlink resources. Information on the resource allocation can be transmitted from a transmitting apparatus to a terminal via a control channel which is located in a predetermined control region separated from a data region in the time-frequency resources of a downlink.

In order to enhance the data transmission throughput, there are many technologies such as Multiple Input/Multiple Output (MIMO), coordinated multi-point transmission/reception (CoMP) and the like but there needs more control information transmitted by the transmitting part such as the base station to apply these technologies. However, because the limited control region includes a lot of control information, it is insufficient for a number of a control channel through which a resource allocation information transmitted.

Meanwhile, in recent years, a wireless communication business is highly interested in a machine type communication. The machine type communication is based on a low speed, low cost data communication between many machines but is not suitable to a recent radio access scheme adapted to a high-speed data communication. There is required not a conventional scheme but a scheme to use a less resource for the low-cost machine type communication.

SUMMARY

Therefore, the present invention has been made in view of the above-mentioned problems, and an aspect of the present invention is to provide a method and apparatus for effective resource allocation in a wireless communication system.

In accordance with an aspect of the present invention, there is provided a transmitting apparatus comprising: a encoder to generate resource allocation information (RIV) converted from the length of a resource allocation region L and an offset thereof j, wherein the resource allocation region consists of contiguous resource block or block group and a transmitter to transmit the resource allocation information to a terminal, wherein the resource allocation information is calculated by the formula below.

$$RIV = (L-1)(N+1) - \frac{L(L-1)}{2} + j,$$
$$j = 0, \ldots, N-L,$$
$$0 < L \le L_{max},$$

OR $$RIV = (L-1)N - \frac{(L-1)(L-2)}{2} + j,$$
$$j = 0, \ldots, N-L,$$
$$0 < L \le L_{max}$$

wherein N is a number of entire resource block or block group and $L_{max}$ is a maximum value of the length of the resource allocation region.

In accordance with another aspect of the present invention, there is provided a method for allocating a resource, the method comprising: generating resource allocation information (RIV) converted from the length of a resource allocation region L and an offset thereof j, wherein the resource allocation region consists of contiguous resource block or block group and transmitting the resource allocation information to a terminal, wherein the resource allocation information is calculated by the formula below.

$$RIV = (L-1)(N+1) - \frac{L(L-1)}{2} + j,$$
$$j = 0, \ldots, N-L,$$
$$0 < L \le L_{max},$$

OR $$RIV = (L-1)N - \frac{(L-1)(L-2)}{2} + j,$$
$$j = 0, \ldots, N-L,$$
$$0 < L \le L_{max}$$

wherein N is a number of entire resource block or block group and $L_{max}$ is a maximum value of the length of the resource allocation region.

In accordance with another aspect of the present invention, there is provided a terminal comprising: a receiver to receive resource allocation information (RIV) to which information about a resource allocation region is encoded, wherein the resource allocation region consists of contiguous resource block or block group and a decoder to decode the resource allocation information so as to extract a length of a resource allocation region L and an offset thereof j, wherein the resource allocation information is calculated by the formula below.

$$RIV = (L-1)(N+1) - \frac{L(L-1)}{2} + j,$$
$$j = 0, \ldots, N-L,$$
$$0 < L \le L_{max},$$

OR

-continued
$$RIV = (L-1)N - \frac{(L-1)(L-2)}{2} + j,$$
$$j = 0, \ldots, N-L,$$
$$0 < L \leq L_{max}$$

wherein N is a number of entire resource block or block group and $L_{max}$ is a maximum value of the length of the resource allocation region.

In accordance with another aspect of the present invention, there is provided a method for receiving a resource allocation information, the method comprising: receiving resource allocation information (RIV) to which information about a resource allocation region is encoded, wherein the resource allocation region consists of contiguous resource block or block group and decoding the resource allocation information so as to extract a length of a resource allocation region L and an offset thereof j, wherein the resource allocation information is calculated by the formula below.

$$RIV = (L-1)(N+1) - \frac{L(L-1)}{2} + j,$$
$$j = 0, \ldots, N-L,$$
$$0 < L \leq L_{max},$$
OR
$$RIV = (L-1)N - \frac{(L-1)(L-2)}{2} + j,$$
$$j = 0, \ldots, N-L,$$
$$0 < L \leq L_{max}$$

wherein N is a number of entire resource block or block group and $L_{max}$ is a maximum value of the length of the resource allocation region.

The above-mentioned present invention is to provide a method and apparatus for effective resource allocation in a wireless communication system.

BRIEF DESCRIPTION OF THE DRAWINGS

FIG. 5 is a diagram illustrating examples of using a part of the data region for the control information;

FIG. 6 is a diagram illustrating examples of either localized or distributive of the E-PDCCH search space;

DETAILED DESCRIPTION OF THE ILLUSTRATED EMBODIMENTS

Figure 1:
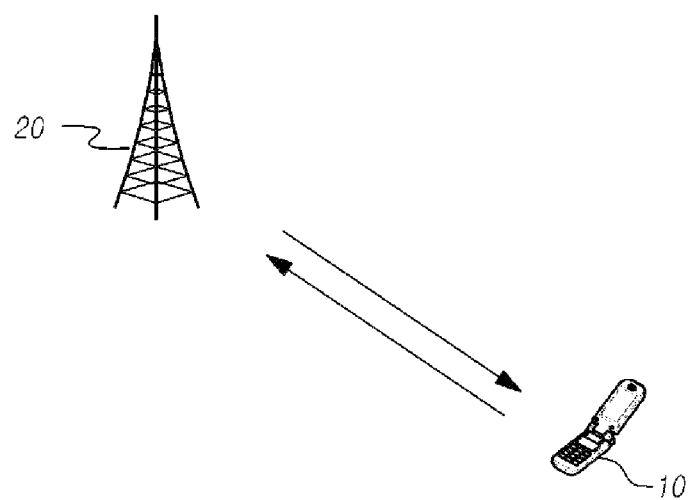
FIG. 1 is a diagram illustrating a wireless communication system according to embodiments of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 is a block diagram illustrating a wireless communication system according to embodiments of the present invention.

The wireless communication system may be widely installed so as to provide various communication services, such as a voice service, packet data, and the like.

Referring to FIG. 1, the wireless communication system may include an user equipment (UE) 10 and a base station (BS) 20. The user equipment 10 and the base station 20 may use various resource allocation methods to be described below.

Throughout the specifications, the user equipment 10 may be an inclusive concept indicating a user terminal utilized in wireless communication, including a User Equipment (UE) in WCDMA, LTE, HSPA, and the like, and a mobile station (MS), a user terminal (UT), a subscriber station (SS), a wireless device, and the like in GSM.

In general, the base station 20 or a cell may refer to a station, and may also be referred to as a Node-B, an evolved Node-B (eNB), a Base Transceiver System (BTS), an access point, a relay node, and the like.

Namely, in this specification, the base station 20 or the cell should be interpreted as having a comprehensive meaning indicating a partial area covered by a BSC (Base Station Controller) in CDMA (Code Division Multiple Access) or a Node-B in WCDMA (Wideband Code Division Multiple Access). Accordingly, the base station 20 or the cell has a meaning including various coverage areas such as a RRH (Radio Remote Head), a relay node, a sector of a macro cell, a site, a mega cell, a macro cell, a micro cell, a pico cell, and a femto cell.

In the specifications, the user equipment 10 and the base station 20 are used as two inclusive transceiving subjects to embody the technology and technical concepts described in the specifications, and may not be limited to a predetermined term or word.

In this specification, the user equipment 10 and the base station 20, which are two transmission and reception subjects used to implement the art or the technical idea described in this specification, are used as a comprehensive meaning, and are not limited by a particularly designated term or word.

There is no limit to multiple access schemes applied to the wireless communication system. For example, use may be made of various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA.

In this respect, use may be made of a TDD (Time Division Duplex) scheme in which uplink transmission and downlink transmission are performed at different times. Otherwise, use may be made of an FDD (Frequency Division Duplex) scheme in which uplink transmission and downlink transmission are performed by using different frequencies. Further, use may be made of a hybrid duplexing scheme in which the TDD and the FDD is combined with each other.

An embodiment of the present invention may be applicable to resource allocation in an asynchronous wireless communication scheme that is advanced through GSM, WCDMA, and HSPA, to be Long Term Evolution (LTE) and LTE-advanced, and may be applicable to resource allocation in a synchronous wireless communication scheme that is advanced through CDMA and CDMA-2000, to be UMB. Embodiments of the present invention may not be limited to a specific wireless communication field, and may be applicable to all technical fields to which a technical idea of the present invention is applicable.

The user equipment 10 and the transmitting apparatus can perform a wires communication.

In a wireless communication, one radio frame may consist of 10 subframes, and one subframe may consist of two slots. The radio frame may have a length of 10 ms, and the subframe may have a length of 1.0 ms. Typically, a basic unit of a data transmission may be a subframe, and a downlink or uplink scheduling may be performed in a unit of subframe.

In the case of a normal cyclic prefix (CP), one slot may include 7 OFDM symbols in the time domain. In the case of an extended cyclic prefix (CP), one slot may include 6 OFDM symbols in the time domain. Each slot may include seven or six OFDM symbols in a time domain and a frequency band of 180 Khz corresponding to 12 subcarriers in a frequency domain, and a time-frequency domain defined as described above may be called a Resource Block (RB), but is not limited thereto.

The transmission/reception point 20 may perform downlink transmission to the terminal 10. The transmission/reception point 20 can transmits a Physical Downlink Shared Channel (PDSCH) as a downlink data channel for unicast transmission. Further, the transmission/reception point 20 may transmit control channels, which include a Physical Downlink Control Channel (hereinafter, referred to as "PDCCH") as a downlink control channel used in order to transmit Downlink Control Information (hereinafter, referred to as "DCI") including scheduling approval information for transmission through an uplink data channel (e.g. a Physical Uplink Shared Channel; "PUSCH") and downlink control information, such as scheduling information necessary for reception of a PDSCH, a Physical Control Format Indicator Channel (PCFICH) for transmitting indicators identifying areas of a PDSCH and a PDCCH, and a Physical HARQ Indicator Channel (PHICH) for transmission of Hybrid Automatic Repeat request (HARQ) confirmation with respect to uplink transmission. In the following description, signal transmission/reception through each channel may be expressed as transmission/reception of the channel.

Figure 2:
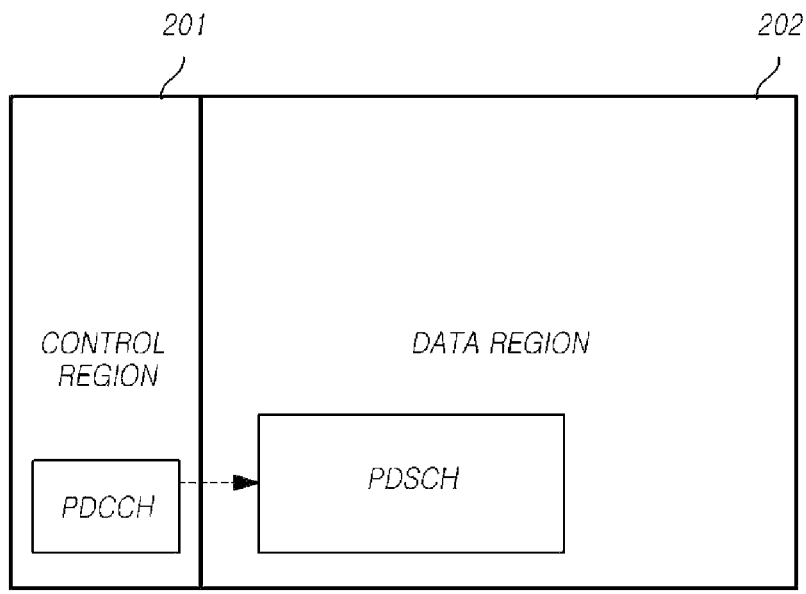
FIG. 2 illustrates one subframe on which downlink transmission is performed.

FIG. 2 illustrates one subframe on which downlink transmission is performed. The horizontal axis represents the time or the symbol and the vertical axis represents the frequency shown in FIG. 2. In one subframe, preceding three OFDM symbols, namely the first to the third symbols, may correspond to control region 201 assigned for control channels such as a physical control format indicator channel (PCFICH), a physical hybrid ARQ indicator channel (PHICH), a physical downlink control channel (PDCCH), and so forth. The remaining OFDM symbols may correspond to data region 202 assigned for data channels such as a physical downlink shared channel (PDSCH). The resource allocation information allocated to each terminal in the frequency and time resources is transmitted through the PDCCH in a downlink.

In a typical (or existing) 3GPP LTE/LTE-A rel-8/9/10 system, control information for uplink/downlink communication and resource allocation information allocated to each terminal in the frequency and time resources may be transmitted through the PDCCH in a downlink. A basic unit of a PDCCH transmission may be a control channel element (CCE). Herein, one CCE may consist of 9 resource element groups (REGs). One REG may include 8 bits so that one CCE consists of 72 bits. The number of the CCE assigned to one PDCCH may be exponentially increased according to the aggregation level such as one, two, four and eight CCEs.

The control information transmitted though the PDCCH, namely a downlink control information (DCI) may include information on a resource region for the resource allocation.

A resource region for resource allocation may be formed based on a time-frequency unit of a resource block (RB). In the case of a broadband, a number of resource blocks may increase and an amount of bits required for indicating the resource allocation information may also increase and thus, the resource allocation information may be processed based on a resource block group (RBG) formed of a few resource blocks. The resource allocation information expressed based on the resource blocks or the resource block groups may be transmitted in a form of Resource Indication Value (RIV) in a resource allocation field included in a PDCCH.

For example, bandwidths considered in LTE may be 1.4/3/5/10/15/20 MHz. When the bandwidths are expressed based on a number of resource blocks, the bandwidths may correspond to 6/15/25/50/75/100, respectively. Sizes (P) of resource block groups expressed by corresponding resource blocks in respective bands may be 1/2/2/3/4/4, respectively. Therefore, a number of resource block groups for each band may be 6/8/13/17/19/25.

Based on a scheme that expresses a way of resource allocation to a resource allocation field, there may be varied types of resource allocation schemes (Type 0, Type 1, and Type 2).

Figure 3:
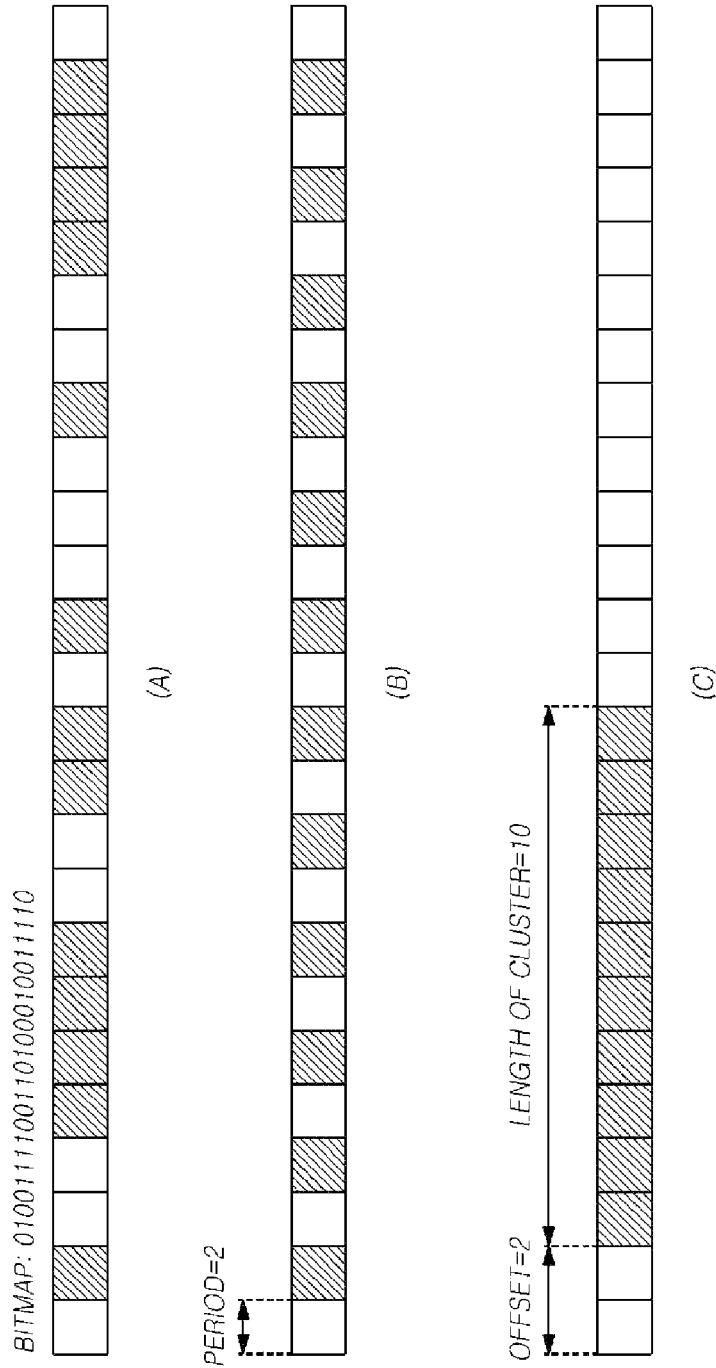
FIG. 3a illustrates a example of a resource allocation scheme of downlink type 0.
FIG. 3b illustrates a example of a resource allocation scheme of downlink type 1.
FIG. 3c illustrates a example of a resource allocation scheme of downlink type 2.

FIG. 3a illustrates a example of a resource allocation scheme of downlink type 0, FIG. 3b illustrates a example of a resource allocation scheme of downlink type 1, and FIG. 3c illustrates a example of a resource allocation scheme of downlink type 2.

Referring to FIG. 3a, from among the varied types of resource allocation schemes, Type 0 may correspond to a scheme that indicates a resource allocation region based on a bitmap format. That is, resource allocation may be expressed to be 1, and non-resource allocation may be expressed to be 0 for each resource block or each resource block group, so as to indicate resource allocation with respect to the entire band.

When a number of resource blocks is $N_{RB}^{DL}$, an amount of bits required for expressing the resource allocation based on Type 0 may be $\lceil N_{RB}^{DL}/P \rceil$.

Referring to FIG. 3b, Type 1, another resource allocation scheme, may correspond to a scheme that indicates a resource allocation region based on a periodic format. That is, type 1 may indicate resource allocation having a period of P and in a form of distributions at regular intervals in the entire allocation region, and may set $\lceil \log_2(P) \rceil$ bits to indicate a size of a subset having the period, may set 1 bit to indicate an offset, and may set $$\lceil \frac{n}{P} \rceil - \lceil \log_2(P) \rceil - 1$$

to indicate predetermined resource allocation. Type 1 may be designed to use the same amount of bits as type 0. In general, when type 0 and type 1 are used together, a differentiation bit to distinguish type 0 and type 1 may be added.

Referring to FIG. 3c, Type 2, as another resource allocation scheme, may correspond to a scheme that is used to allocate a contiguous resource region having a predetermined length. Type 2 may be expressed based on an offset at a starting point (a point before the start) of the entire resource allocation region and a length of the resource allocation region (referred to as a "cluster"). Unlike type 0 and type 1 that indicate noncontiguous resource allocation, type 2 may indicate and require only a contiguous resource region and thus, an amount of bits required may be less than type 0 and type 1 when a large number of resource blocks are used in a system that uses a wide band. The amount of bits required may be $$\left\lceil \log_2 \frac{N_{RB}^{DL}(N_{RB}^{DL}+1)}{2} \right\rceil.$$

Meanwhile, a scheme to indicate the resource allocation information in the above mentioned resource allocation field in an uplink may be Type 0 and Type 1.

The uplink Type 0 of resource allocation scheme is equal to the downlink Type 2 of resource allocation scheme. Namely, in case of Type 0, RIV is represented by an offset from a start point of a contiguous resource allocation region, namely a cluster, in an entire resource region and the length of the resource allocation region. When a number of resource blocks is $N_{RB}^{UL}$, an amount of bits required for expressing the resource allocation based on Type 0 may be $\lceil \log_2(N_{RB}^{UL}(N_{RB}^{UL}+1)/2) \rceil$.

Figure 4:
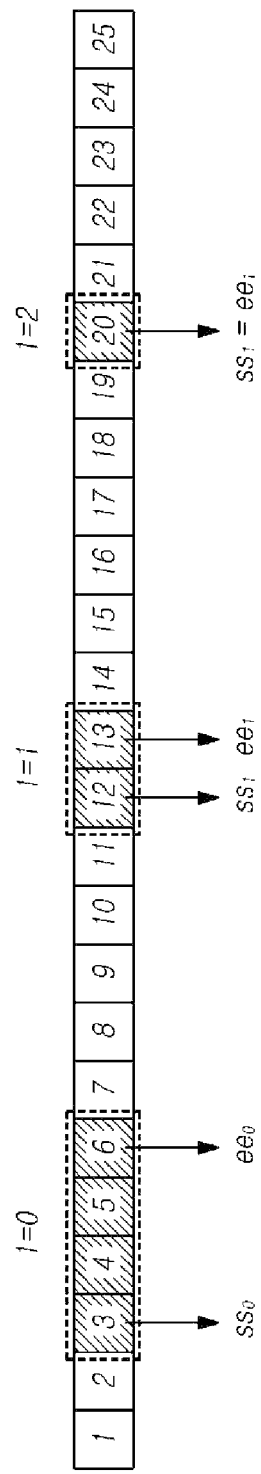
FIG. 4 is a diagram illustrating an example of a resource allocation scheme of uplink type 1.

FIG. 4 is a diagram illustrating an example of a resource allocation scheme of uplink type 1.

Referring to FIG. 4, the resource allocation scheme of type 1 is to indicate the resource allocation region with a plurality of non-contiguous clusters. When the number of the clusters is larger than four, the resource allocation scheme of type 1 needs to require a signal overhead for the resource allocation and acquires a low gain by the resource allocation so that only the restricted number, for example two to four, of the clusters can be considered. the resource allocation scheme of type 1 may calculate RIV for the resource allocation by using a start indices ss0, ss1 and ss2 which are start points or starting resource blocks (or resource block group) of each cluster and an end indices ee0, ee1 and ee2 which are end points or a ending resource blocks (or resource block group) of each cluster. The amount of bits required in type 1 is $$\left\lceil \log_2 \left( \binom{\lceil N_{RB}^{UL}/P+1 \rceil}{4} \right) \right\rceil$$

when the number of the clusters is restricted to two.

In order to enhance the data transmission throughput, there are many technologies such as Multiple Input/Multiple Output (MIMO), coordinated multi-point transmission/reception (CoMP) and the like but there needs more control information transmitted by the transmitting part such as the base station to apply these technologies. However, because the limited control region includes a lot of control information, it is insufficient for a number of a control channel through which resource allocation information is transmitted.

To increase the maximum number of PDCCHs within the control region 201, there may be considered enhanced transmission efficiency of the conventional control region. There may be considered the newly defined configuration of the existing PDCCH within the conventional control region. It is considered that as the length of a payload in a DCI format of the PDCCH shorter, so an encoding rate in a encoder side is lower and its capacity is higher, thereby reducing the size of the necessary payload. When the encoding rate is relatively high, the aggregation level may be increased for the terminal with poor channel conditions so that the number of the CCE occupied by the conventional control region may be increased and the maximum number of the PDCCH in the overall control region may be reduced. Such compact PDCCH can functionally maximally prevent the rise of this aggregation level. Compared with the conventional and the compact PDCCH, it is necessary to compress each field in the DCI format and the resource allocation region.

To spatially solve an insufficient control region 201, it is possible to use a part of the data region for the control information.

FIG. 5a is a diagram illustrating one example of using a part of the data region for the control information. There is assigned an enhanced-PDCCH or extended-PDCCH (E-PDCCH) 502 within the data region 202 which includes the resource allocation information of the PDSCH or the control information. The PDCCH 503 including information on a resource assigned for the E-PDCCH 502 is located in the control region 201. The PDCCH 503 doesn't include the resource allocation information of the PDSCH 501 or PUSCH and other control information, or minimally includes that. Further The PDCCH 503 includes an allocation information of the E-PDCCH 502 and the related control information, for example MCS (Modulation and Coding Scheme), MIMO scheme and the like so that the size thereof can be reduced compared to the conventional PDCCH. The terminal can find out the PDCCH assigned to itself by blind decoding in a search space of the control region 201 and when this PDCCH includes information on a resource assigned to the E-PDCCH 502, it can read on the E-PDCCH 502 through the PDCCH. The terminal can identify information on which the PDSCH 501 or the PUSCH is assigned to a resource through the E-PDCCH.

FIG. 5b is a diagram illustrating other example of using a part of the data region for the control information. There is set an E-PDCCH search space 602 assigned to the E-PDCCH within the data region 202 which includes the resource allocation information of the PDSCH 601 or the control information. The plurality of control information may be located in the E-PDCCH search space 602. The PDCCHs 603 and 604 including information on a resource assigned for the E-PDCCH search space 602 are located in the control region 201.

The PDCCHs 603 and 604 don't include the resource allocation information of the PDSCH 601 or PUSCH and other control information, or minimally include that. Further The PDCCH 603 and 604 includes an resource allocation information of the E-PDCCH search space 602 and the related control information, for example MCS (Modulation and Coding Scheme), MIMO scheme and the like so that the size thereof can be reduced compared to the conventional PDCCH. The plurality of the PDCCHs 603 and 604 may indicate the same E-PDCCH search space 602. The terminal can find out the PDCCHs 603 and 604 assigned to itself by blind decoding in the E-PDCCH search space 602 and when these PDCCHs include information on a resource assigned to the E-PDCCH search space 602, it can read on a location of the E-PDCCH search space 602 through the PDCCHs. The terminal can find out the E-PDCCH assigned to itself by blind decoding in the search space 602, it can identify information on which the PDSCH 601 or the PUSCH is assigned to a resource through the E-PDCCH.

In the above mentioned examples of using a part of the data region for the control information in FIGS. 5a and 5b, the PDCCH including the resource allocation information on the E-PDCCH or the E-PDCCH search space needs to be distinguished from the conventional PDCCH. Hereafter, the PDCCH including the resource allocation information on the E-PDCCH or the E-PDCCH search space is referred as an "indicating PDCCH" in the specification. The indicating PDCCH and the conventional PDCCH are distinguished with each other by either the newly defined transmission mode or information included in the PDCCH to order to distinguish with each other.

As mentioned above, the indicating PDCCH may be designed to have the relatively smaller length of information compared with the conventional PDCCH.

Meanwhile, although the E-PDCCH is configured by the indicating PDCCH as mentioned above, it may be configured that without the indicating PDCCH. Information to configure the E-PDCCH may be transmitted through the higher layer signaling such as a RRC (Radio Resource Control) signaling, which means that the search space is configured through the higher layer signaling and the control information including MIMO/MCS related information is transmitted through that. The terminal may not dynamically but semi-statically identify the search space. The terminal may perform the blind decoding in a predetermined search space and extract the E-PDCCH corresponding to each terminal through CRC (cyclic redundancy check) check.

As mentioned above, in view of the configuration of the E-PDCCH, it is possible to use either the indicating PDCCH dynamically or the higher layer signaling semi-statically. The search space for the E-PDCCH is configured with either localized or distributive/distributed configuration.

FIG. 6 is a diagram illustrating examples of either localized or distributive of the E-PDCCH search space. Referring to FIG. 6A, the E-PDCCH search space may be configured with the localized configuration. In case of the localized configuration, it is capable of acquiring a frequency selective gain by using specific frequency resource. Referring to FIG. 6B, the E-PDCCH search space may be configured with the distributive configuration. In this case, the E-PDCCH search space is spatially distributed in the frequency domain. In case the E-PDCCH is spatially distributed in the search space, the E-PDCCH may acquire a frequency diversity gain. When the E-PDCCH search space is configured through the indicating PDCCH or the higher layer signaling, timing problem related to the decoding delay different from the conventional PDCCH may be happen. Because the conventional PDCCH is contained in the control region located at a preceding position of the subframe, the corresponding signal can be received and decoded in the first. However because the E-PDCCH is contained in the data region, it can be decoded after the entire subframe is completely received. Therefore, the E-PDCCH has more temporal constrains required for the decoding compared to the conventional PDCCH. Such temporal constrains functions as the constrains for the final PDSCH decoding as a result.

When the indicating PDCCH directly indicates the E-PDCCH as shown in FIG. 5A, most of blind decoding is performed at the control region and the decoding for the E-PDCCH in the data region is required just one time so that there are relatively few temporal constrains compared to configuring the E-PDCCH through the higher layer signaling.

When the indicating PDCCH or the higher layer signaling indicates the E-PDCCH search space, there happen temporal constrains and constrain the time to assign to the PDSCH decoding. Therefore it is capable to limit the size of a transmission block for the PDSCH as a scheme to reduce the amount of decoding enough to decode the PDSCH. In other words, it means that it is capable to limit the size of all the resource block or the resource block group assigned to the PDSCH.

Meanwhile, in recent years, a wireless communication business is highly interested in a machine type communication. The machine type communication (MTC) may be variously referred to as a machine to a machine communication (M2M), Internet of things (IoT), a smart device communication (SDC), or a machine oriented communication and the like.

The machine type communication may refer to a variety of communications which can be performed without human intervention or with minimal human intervention in the process of communication. The machine type communication may be used in such various fields as an intelligent metering (a smart metering), an electronic health (e-health), a home appliance communication (a connected consumer), a city automation, an automotive application, a smart grid and the like.

Most of an application of the machine type communication is based on the low speed data communication of low bit rate. The communication between the terminal and the transmitting apparatus for most of the machine type communication have characteristic of infrequency to rarely transmit and receive a data. The MTC terminal is a terminal to communicate with other machine with little or no human intervention so that the power thereof needs to be continuously maintained for a long time with no human intervention.

In recent years, a wireless communication business is highly interested in a machine type communication and such standardization has been performed. In specific, standardization related to the MTC in the 3GPP LTE has been performed and the study for the low cost MTC has been continually studied. Most of an application of the MTC is based on the low speed data communication between many machines and mismatched with LTE-based wireless access scheme which is evolved for achieving the high speed data communication. Therefore the previous GSM/GPRS (Global Systems for Mobile communications/General Packet Radio Service)-based wireless access scheme has been considered compared with LTE-based. However when the cellular mobile communication is evolved based on the LTE-based high speed data communication in the future, it is not preferable that there are a plurality of RAT (Radio Access Technology) and a plurality of bands in the cellular network in view of the cost. Therefore development for the low cost MTC terminal based on the LTE is interesting.

In order to implement the low cost MCT, the wireless communication system may need the following requirement.

First, the wireless communication system must accommodate a very large number of MTC terminals. When a very large number of MTC terminals perform the communication, it is capable of preventing the concentration of traffic at the same time.

Second, there must be implemented the MTC terminal suitable for a data rate of a low speed. Further, the power used for communication must be reduced.

Third, there is no problem with the previous other communication device.

Forth, there is low variation in the hardware implementation of the transmitting apparatus.

One of various schemes to configure the above mentioned MTC terminal is to limit a maximum size of resource allocation possible for a single terminal. This prefers to the low cost MTC required for a low data rate and at the same time reduces the complexity for decoding and encoding so to lower the cost necessary for implementation. For example, as the downlink resource allocation is limited, so is the maximum size of data per subframe necessary for allocating to the terminal. Therefore the configuration complexity of a turbo decoder, the configuration complexity of a channel estimator, the decoding complexity to perform procedure related to MIMO and the like is limited and the complexity is hugely lowered compared with that required for the original receiver of the LTE terminal so that the chip price for final implementation can be lowered. A mount of battery power required for the terminal is also lowered so that there can extend the battery duration.

In order to configure the above mentioned compact PDCCH, the conventional PDCCH format must be changed and the scheme to limit the maximum size of the resource allocation must be considered.

The resource allocation for the above mentioned E-PDCCH is different the resource allocation for the previous data allocation and needs only the limited resource allocation, thereby capable of limiting the maximum size thereof.

The E-PDCCH decoding in the above mentioned E-PDCCH search space leads to the constrains of time necessary for PDSCH decoding so that the resource allocation for the PDSCH in the E-PDCCH may be too restrictive compared with the conventional data allocation.

It is preferable that the maximum resource allocation must be limited because the maximum downlink/uplink transmission rate of the above mentioned low cost MTC terminal is very low compared with that of the previous LTE terminal and the complexity for transmitting and receiving is lowered so that the price can be lowered.

In order words, the resource allocation scheme for the compact PDCCH, the indicating PDCCH, the E-PDCCH and the PDCCH for the MTC terminal may be compressed resource allocation scheme as described below.

Figure 7:
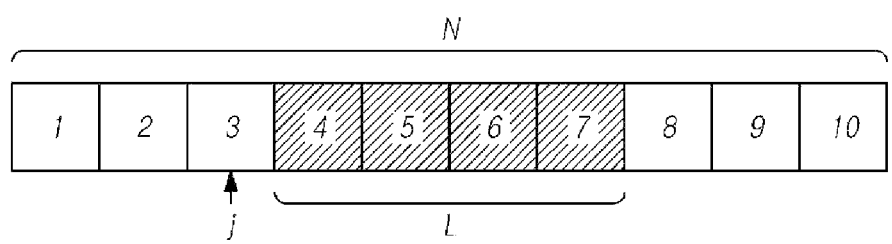
FIG. 7 illustrates a method to allocate a resource according to one embodiment of the present invention.

FIG. 7 illustrates a method to allocate a resource according to one embodiment of the present invention. FIG. 7 illustrates an example to contiguously assign the resource in the downlink or the uplink.

The number of entire resource blocks or block groups is N, the length of the resource allocation to which the resource is assigned is L and $L \leq L_{max}$ wherein $L_{max}$ is a maximum value of the length of the resource allocation region.

When the length of the resource allocation for the cluster is L, an offset of the cluster j, namely an index of the first resource block or block group for the cluster, may be 0 to $N-L (0 \leq j \leq N-L)$.

As an example, in a method to allocate the value of the RIV, the offset according to the predetermined length L is assigned to the values from the smaller to the larger. After all offset is assigned, the offset according to the following length L+1 is assigned to the values from the smaller to the larger. For example, when there is N=10 and $L_{max}$=4, the resource allocation of ten offsets (j=0 to 9) is set to RIV=0 to 9 in case of L=1, the resource allocation of nine offsets (j=0 to 8) is set to RIV=10 to 18 in case of L=2, the resource allocation of eight offsets (j=0 to 7) is set to RIV=19 to 26 in case of L=3, the resource allocation of seven offsets (j=0 to 6) is set to RIV=27 to 33 in case of L=4.

In this case, the value of the RIV for allocating the resource is generally represented by the following formula 1.

$$RIV = (L-1)(N+1) - \frac{L(L-1)}{2} + j, \quad \text{[Formula 1]}$$
$$j = 0, \ldots, N-L,$$
$$0 < L \leq L_{max},$$

or $$RIV = (L-1)N - \frac{(L-1)(L-2)}{2} + j,$$
$$j = 0, \ldots, N-L,$$
$$0 < L \leq L_{max}$$

In case of the formula 1, the maximum value of the RIV (RIVmax) becomes $$RIV_{max} = L_{max}N - \frac{L_{max}(L_{max}-1)}{2} - 1$$

and a mount of bits required for the resource allocation becomes $\lceil \log_2(RIV_{max}+1) \rceil$. When the RIV is encoded by the formula 1, the decoding procedure is as follows.

At first, there is obtained the value of $$b(L) = (L-1)(N+1) - \frac{L(L-1)}{2}$$

according to L=1, 2, ..., $L_{max}$ and the length L with which $b(L) \leq RIV < b(L+1)$ is satisfied. The offset j is then obtained by the equation of j=RIV−b(L). For example, when N=10 and $L_{max}$=4, b(1)=0, b(2)=10, b(3)=19 and b(4)=27. When the value of the RIV is 25, L=3 in condition of b(3)≤RIV<b(4) according to the length L to obtain j=RIV−b(3)=6 for the offset j.

As other example, in a method to allocate the value of the RIV, assuming that the offset j according to all the length L is 0 to N−1 the offset according to the predetermined length L is assigned to the values from the smaller to the larger. For example, when there is N=10 and $L_{max}$=4, the resource allocation of ten offsets (j=0 to 9) is set to RIV=0 to 9 in case of L=1, the resource allocation of nine offsets (j=0 to 8) is set to RIV=10 to 18 in case of L=2, the resource allocation of eight offsets (j=0 to 7) is set to RIV=20 to 27 in case of L=3, the resource allocation of seven offsets (j=0 to 6) is set to RIV=30 to 36 in case of L=4.

In this case, the value of the RIV for allocating the resource is generally represented by the following formula 1.

$$RIV=(L-1)N+j, j=0,\ldots,N-L, 0<L \leq L_{max}$$ [Formula 2]

In case of the formula 2, the maximum value of the RIV (RIVmax) becomes $RIV_{max}=L_{max}N-1$ and a mount of bits require for the resource allocation becomes $\lceil \log_2(RIV_{max}+1) \rceil$.

When the RIV is encoded by the formula 2, the decoding procedure is as follows.

In other words, if the received value of the RIV is divide by N, the value of L may be obtained. If the value of L is performed the module arithmetic by N, the value of j can be obtained.

At first, in other method, there is obtained the value of $b(L)=(L-1)N$ according to $L=1, 2, \ldots, L_{max}$ and the length L with which $b(L) \leq RIV < b(L+1)$ is satisfied. The offset j is obtained by the equation of $j=RIV-b(L)$. For example, when $N=10$ and $L_{max}=4$, there are $b(1)=0$, $b(2)=10$, $b(3)=20$ and $b(4)=30$. When the value of the RIV is 25, $L=3$ in condition of $b(3) \leq RIV < b(4)$ according to the length L to obtain $j=RIV-b(3)=5$ for the offset j.

The above mentioned resource allocation scheme in case of the contiguous resource allocation may be replaced by the conventional resource allocation scheme of the downlink Type 2 or the uplink Type 0.

Figure 8:
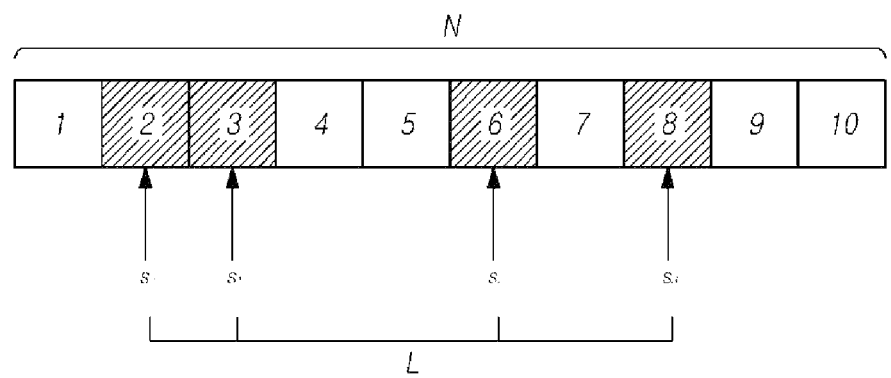
FIG. 8 illustrates a method to allocate a resource according to the other embodiment of the present invention.

FIG. 8 illustrates a method to allocate a resource according to the other embodiment of the present invention.

The number of entire resource blocks or block groups is N, the length of the resource allocation to which the resource is assigned is L and $L \leq L_{max}$ wherein $L_{max}$ is a maximum value of the length of the resource allocation region in FIG. 8.

The enumerative source coding may be used as a scheme of expressing a number (N) of all cases possible from a given number L. The enumerative source coding may be expressed as follows.

A resource allocation information r may be calculated with respect to an index set of resource block or block group $\{s_k\}_{k=0}^{M-1}$, $(1 \leq s_k \leq N, s_k < s_{k+1})$ to which the number of M resources is aligned in ascending order.

$$r = \sum_{k=0}^{M-1} \binom{N-s_k}{M-k}$$ [Formula 3]

$$\binom{x}{y} = \begin{cases} \binom{x}{y} = {}_xC_y & x \geq y \\ 0 & x < y \end{cases},$$

here, $$r \in \left\{0, \ldots, \binom{N}{M}-1\right\}.$$

A decoding process for the above will be expressed as follows. Until the combination value $$\binom{N-x}{M-k}$$

for the value N-x which is the number of all resource block or block group N minus the variable x and the value M-k where is the number of allocated resource block or block group M minus the coefficient index k, is less than or equal to the resource allocation information r, the variable is increased one by one. The variable x when the combination value is less than or equal to the resource allocation information r is determined as an index of the resource block or block groups sk to which the resource is allocated. The following resource allocation information r which is the preceding resource allocation information minus the combination value r is also stored and the above procedure is iterated for the following coefficient index. All indices $sk(1 \leq k \leq M)$ is extracted from the resource allocation information r through the above mentioned scheme.

$$x_{min} = 1$$
for k = 0 to M − 1,
$$x = x_{min}$$

$$p = \binom{N-x}{M-k}$$

while p > r,
$$x = x + 1$$

$$p = \binom{N-x}{M-k}$$

end $$s_k = x$$
$$x_{min} = s_k + 1$$
$$r = r - p$$
end

As an example, the resource allocation field may consist of two fields.

The first field may represent the number of the resource block or block group to which the resource is allocated and the number of bit of the first field may be expressed as $\lceil \log_2 L_{max} \rceil$. For example, when $L_{max}=4$, the first field representing the number of the resource block or block group may consist of 2 bits. In this example, when the value of the first field is 0 (00), the number of the resource blocks or block groups is one. When the value of the first field is 1 (01), the number of the resource blocks or block groups is two. When the value of the first field is 2 (10), the number of the resource blocks or block groups is three. When the value of the first field is 3 (11), the number of the resource blocks or block groups is four.

Further the first field may represent the length of the resource blocks or block groups L to which the resource is allocated. For example, the value of the first field K and the length of the resource blocks or block groups L may have relationship with $L=2$ k. As an example, the number of the resource blocks or block groups may consist of 2 bits. In this example, when the value of the first field is 0 (00), the number of the resource blocks or block groups is one. When the value of the first field is 1 (01), the number of the resource blocks or block groups is two. When the value of the first field is 2 (10), the number of the resource blocks or block groups is three. When the value of the first field is 3 (11), the number of the resource blocks or block groups is four.

The second field may represent the value with the number of bits necessary for the maximum resource allocation $L_{max}$ by the enumerative source coding. In case of the maximum resource allocation, the value of the enumerative source coding may be 0 to $$\binom{N}{L_{max}} - 1$$

so a mount of bits required of the second field is $$\left\lceil \log_2 \binom{N}{L_{max}} \right\rceil.$$

Referring to the formula 3, the value of the RIV in the second field become $$RIV = \sum_{k=0}^{L-1} \binom{N - s_k}{L - k}.$$

For example, When N=10 and $L_{max}$=4, a mount of bits in the first field is $\lceil \log_2 4 \rceil$ and a mount of bits in the first field are $$8 \left( = \left\lceil \log_2 \binom{10}{4} \right\rceil = \lceil \log_2 210 \rceil \right)$$

so that the total amount of bits in the resource allocation field is 10 (=2+8). When the resources is allocated to four fields such as s0=2, s1=3, s2=6, s3=8, the value of the second field is calculated as follows.

$$RIV = \sum_{k=0}^{L-1} \binom{N - s_k}{L - k}$$
$$= \binom{10-2}{4} + \binom{10-3}{4-1} + \binom{10-6}{4-2} + \binom{10-8}{4-3}$$
$$= \binom{8}{4} + \binom{7}{3} + \binom{4}{2} + \binom{2}{1}$$
$$= 70 + 35 + 6 + 2$$
$$= 113$$

When the value of the resource allocation field is decoded, the length of the resource blocks or block groups L to which the resource is allocated may be extracted from the value of the first field and the index of the resource blocks or block groups sk be extracted from the value of the second field r (=RIV), N and M (=L) by the above mentioned decoding scheme.

As other scheme to designate the value of the RIV in the resource allocation field, it is considered that after the value is completely allocated in an order of the enumerative source coding with respect to the number of the predetermined resource blocks or block groups L, the same procedure is performed with respect to the number of the following resource block or block group L+1. For example, assuming that N=10 and $L_{max}$=4. In this example, in case of L=1, the value of the RIV of 0 to 9 is allocated in an order of the enumerative source coding with respect to the number of $$10 \left( = \binom{10}{1} \right).$$

In case of L=2, the value of the RIV of 10 to 54 is allocated in an order of the enumerative source coding with respect to the number of $$45 \left( = \binom{10}{2} \right).$$

In case of 3, the value of the RIV of 55 to 174 is allocated in an order of the enumerative source coding with respect to the number of $$120 \left( = \binom{10}{3} \right).$$

In case of 4, the value of the RIV of 174 to 384 is allocated in an order of the enumerative source coding with respect to the number of $$210 \left( = \binom{10}{4} \right).$$

In this case, the value of the RIV for the resource allocation is generally represented by formula 4 as follows.

$$RIV = \sum_{n=1}^{L-1} \binom{N}{n} + \sum_{k=0}^{L-1} \binom{N - s_k}{L - k} \quad \text{[Formula 4]}$$

In the formula 4, a maximum value of the RIV is $$RIV_{max} = \sum_{n=1}^{L_{max}} \binom{N}{n} - 1$$

and a mount of bits required for the resource allocation are $$\lceil \log_2(RIV_{max} + 1) \rceil = \left\lceil \log_2 \left( \sum_{n=1}^{L_{max}} \binom{N}{n} \right) \right\rceil.$$

For example, in an example of FIG. 8, when N=10 and $L_{max}$=4, a mount of bits required for the resource allocation are represented as follows.

$$\left\lceil \log_2 \left( \sum_{n=1}^{L_{max}} \binom{N}{n} \right) \right\rceil = \left\lceil \log_2 \left( \binom{10}{1} + \binom{10}{2} + \binom{10}{3} + \binom{10}{4} \right) \right\rceil =$$

$$\lceil \log_2(10 + 45 + 120 + 210) \rceil = \lceil \log_2(385) \rceil = 9$$

When the resources is allocated to four resource blocks such as s0=2, s1=3, s2=6, s3=8, the value of the RIV is calculated as follows.

$$RIV = \sum_{n=1}^{L-1} \binom{N}{n} + \sum_{k=0}^{L-1} \binom{N-s_k}{L-k}$$

$$= \binom{10}{1} + \binom{10}{2} + \binom{10}{3} + \binom{10-2}{4} + \binom{10-3}{4-1} + \binom{10-6}{4-2} + \binom{10-8}{4-3}$$

$$= \binom{10}{1} + \binom{10}{2} + \binom{10}{3} + \binom{8}{4} + \binom{7}{3} + \binom{4}{2} + \binom{2}{1}$$

$$= 10 + 45 + 120 + 70 + 35 + 6 + 2$$

$$= 288$$

When the value of the resource allocation field is decoded, the decoding procedure is as follows.

At first, the value of $$b(L) = \sum_{n=1}^{L-1} \binom{N}{n}$$

is obtained with respect to L=1, 2, ..., $L_{max}$ and the length L satisfied with b(L)≤RIV<b(L+1) is obtained. For example, When N=10 and $L_{max}$=4, there become b(1)=0, b(2)=10, b(3)=55 and b(4)=175. When the value of the RIV is 288, there becomes L=4 by the equation of b(4)≤RIV.

Next, RIV'=RIV−b(L) is calculated. When the value of the RIV is 288, RIV'=RIV−b(4)=288−175=113 is obtained.

The index of the resource block or block groups sk be extracted from the value of the second field r(=RIV'), N and M(=L) by the above mentioned decoding scheme of the enumerative source coding.

When M=10, M=4(=L) and r=113(=RIV'), $$p = \binom{10-1}{4} = 126$$

is greater than the r in case of x=1 and $$p = \binom{10-2}{4} = 70$$

is smaller than the value of r in case of x=2 and k=0 so that the value of s0 is determined to "2" and the value of r is updated to "113−70=43". Next $$p = \binom{10-3}{4-1} = 35$$

is smaller than the value of r in case of x=3 and k=1 so that the value of s1 is determined to "3" and the value of r is updated to 43−35=8. Next $$p = \binom{10-4}{4-2} = 15$$

is greater than the value of r in case of x=4 and k=2, $$p = \binom{10-5}{4-2} = 10$$

is greater than the value of r in case of x=5 and k=2 and $$p = \binom{10-6}{4-2} = 6$$

is smaller than the value of r in case of x=6 and k=2 so that the value of s2 is determined to "6" and the value of r is updated to "8−6=2". Next, $$p = \binom{10-7}{4-3} = 3$$

is greater than the value of r in case of x=7 and k=3 and $$p = \binom{10-6}{4-2} = 6$$

is smaller than the value of r in case of x=8 and k=3 so that the value of s3 is determined to "8".

The above mentioned resource allocation scheme in case of the non-contiguous resource allocation may be replaced by the conventional resource allocation scheme of the downlink Type 0 and 1, or the uplink Type 1.

Figure 9:
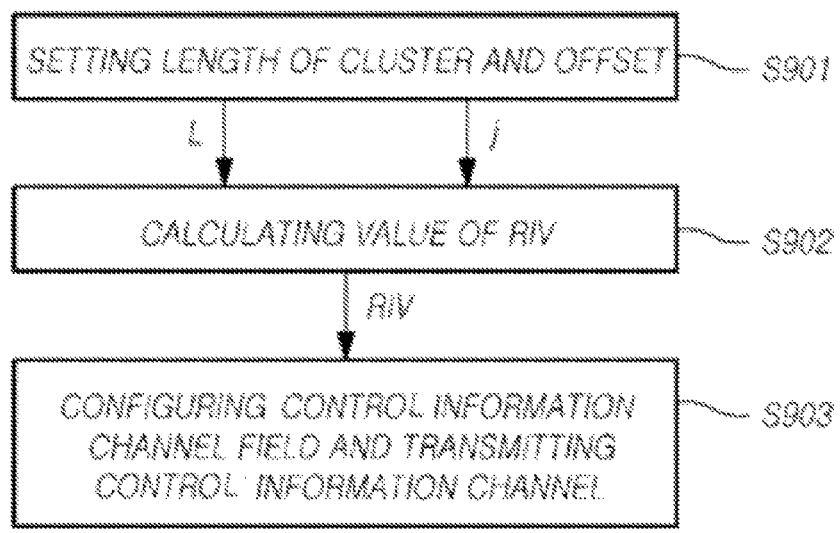
FIG. 9 is a flowchart illustrating a method to allocate a resource for a transmitting apparatus according to the other embodiment of the present invention.

FIG. 9 is a flowchart illustrating a method to allocate a resource for a transmitting apparatus according to the other embodiment of the present invention.

Referring to FIG. 9, the transmitting apparatus sets the length L and the offset of the cluster allocated in the data region at S901. The cluster j may be a resource to which the PDSCH or the PUSCH is allocated in FIG. 2, the E-PDCCH is allocated in FIG. 5A, or the E-PDCCH search space is allocated in FIG. 5B.

The length of the cluster L may be limited to less than the maximum value $L_{max}$. For example, the length of the cluster L may be limited in case of at least one of the compact PDCCH which is shorter than the conventional PDCCH, the indicating PDCCH which indicates either the E-PDCCH or the E-PDCCH search space, the E-PDCCH and the PDCCH which indicates the data region of the MTC terminal as the control information channel.

The maximum value $L_{max}$ of the length of the cluster may be predefined. As one example, when the terminal communicating with the transmitting apparatus is the MTC terminal, the maximum value $L_{max}$ of the length of the cluster may be predefined. As other example, when the transmitted control channel is one of the compact PDCCH, the indicating PDCCH and the E-PDCCH, the maximum value $L_{max}$ of the length of the cluster may be predefined.

The maximum value $L_{max}$ of the length of the cluster may be transmitted through the higher layer signaling such as RRC (Radio Resource Control).

Next, the transmitting apparatus calculates the value of the RIV using the length L and the offset of the cluster j at S902. The value of the RIV may be calculated by the above mentioned formulas 1 and 2. However various embodiments is not limited to the above mentioned formulas 1 and 2, it may is calculated by various functions or equation capable of uniquely determining the length L and the offset j from the RIV.

The calculated value of the RIV is transmitted through the configured resource allocation field in the control information channel at S903.

Meanwhile the control information channel may be the compact PDCCH which includes the resource allocation information of the PDSCH or the PUSCH and have the compressed length shorter than the conventional PDCCH. The compact PDCCH and the conventional PDCCH may be transmitted under the newly defined transmission mode. The transmitting apparatus may transmit, to the terminal, the configuration information on which of the compact PDCCH and the conventional PDCCH will be transmitted before transmitting the PDCCH to the terminal. The compact PDCCH and the conventional PDCCH also have the different length and the terminal may identify the kind of the PDCCH from the length thereof and extract the allocation information of the PDSCH or the PUSCH.

The control information channel may be the indicating PDCCH which includes the resource allocation information to indicate either the E-PDCCH or the E-PDCCH search space. The indicating PDCCH may include control information such as MCS, MIMO scheme and the like related to the resource allocation information of either the E-PDCCH or the E-PDCCH search space. The indicating PDCCH and the conventional PDCCH may be transmitted under the newly defined transmission mode. The transmitting apparatus may transmit, to the terminal, the configuration information on which of the indicating PDCCH and the conventional PDCCH will be transmitted before transmitting the PDCCH to the terminal. The indicating PDCCH and the conventional PDCCH also have the different length and the terminal may identify the kind of the PDCCH from the length thereof and extract the allocation information of the PDSCH or the PUSCH.

The control information channel may be the E-PDCCH located in the E-PDCCH search space. The configuration information for the E-PDCCH search space may be transmitted from the transmitting apparatus to the terminal through the indication PDCCH or the higher layer signaling. The E-PDCCH located In the E-PDCCH search space in FIG. 5B may have the compressed length shorter than the E-PDCCH in FIG. 5A directly indicated by the conventional PDCCH and/or the indicating PDCCH. The transmitting apparatus may transmit, to the terminal, the configuration information on which of the compact PDCCH with the compressed length and the conventional PDCCH with the not-compressed length will be transmitted.

The control information channel may be the PDCCH which includes the resource allocation information for of the PDSCH or the PUSCH transmitted to the MTC terminal. The PDCCH transmitted to the MTC terminal may have the compressed length shorter than the PDCCH transmitted to the general terminal. The transmitting apparatus may know that the terminal receiving the PDCCH is the MTC terminal and transmit the PDCCH with the compressed length. The transmitting apparatus may also transmit, to the terminal, the configuration information on which of the PDCCH with the compressed length and the conventional PDCCH will be transmitted before transmitting the PDCCH to the terminal.

The PDCCH with the compressed length and the conventional PDCCH also have the different length and the terminal may identify the kind of the PDCCH from the length thereof and extract the allocation information of the PDSCH or the PUSCH.

Figure 10:
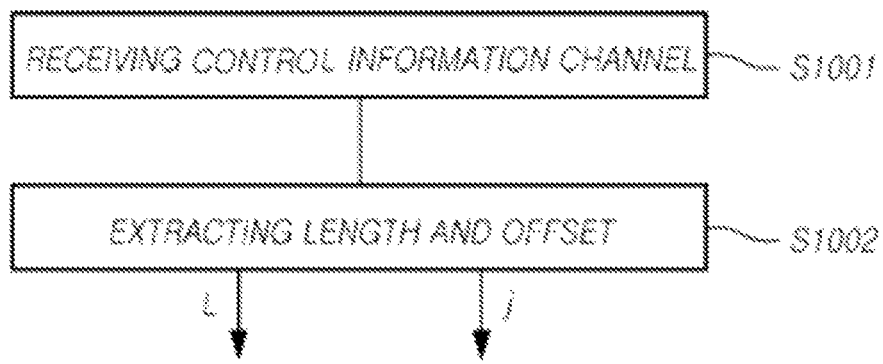
FIG. 10 is a flowchart illustrating a method to allocate a resource for a terminal according to another embodiment of the present invention.

FIG. 10 is a flowchart illustrating a method to allocate a resource for a terminal according to another embodiment of the present invention.

The terminal receives the control information channel from the transmitting apparatus at S1001. The received control information channel may be the compact PDCCH, the indicating PDCCH, the E-PDCCH and the PDCCH for the MTC terminal. Further the terminal extracts the value of the RIV from the resource allocation information field and decodes it to extract a length of the allocated resource, namely a length of the cluster L, and an offset thereof j at S1002. It is possible to extract the length L and the offset j either simultaneously or in order. The allocated resource may be the resource for at least one of the PDSCH, the PUSCH, the E-PDCCH and the E-PDCCH search space.

Figure 11:
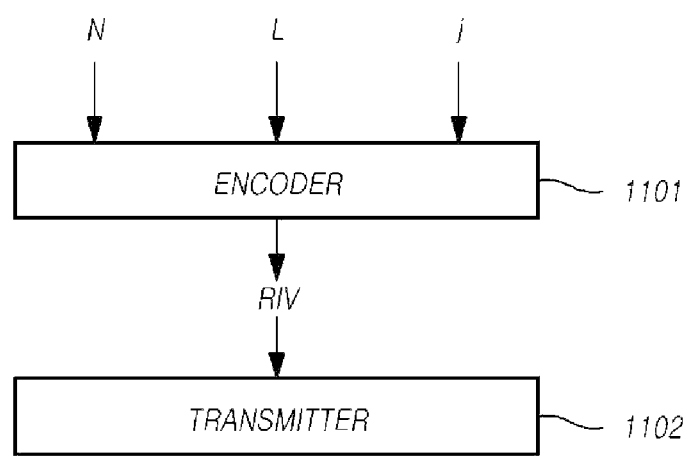
FIG. 11 is a block diagram illustrating a transmitting apparatus according to further another embodiment.

FIG. 11 is a block diagram illustrating a transmitting apparatus according to further another embodiment.

Referring to FIG. 11, the transmitting apparatus may comprise an encoder 1101 and the transmitter 1102.

The encoder 1101 receives information on the total number of the resource blocks or block groups N, the length of the cluster L and the offset thereof j and calculates the value of the RIV which will be input in the resource allocation field based on them. The cluster may be one of the PDSCH, the PUSCH, the E-PDCCH, and the E-PDCCH search space. The value of the RIV is calculated by the above mentioned Formula 1 and 2.

The transmitter transmits the calculated RIV. The value of the RIV may be transmitted through the control information channel included in the DCI. The control information channel may be the compact PDCCH, the indicating PDCCH, the E-PDCCH and the PDCCH for the MTC terminal.

Figure 12:
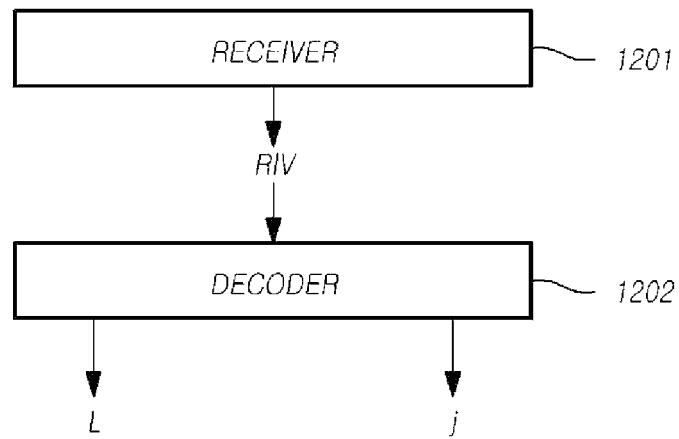
FIG. 12 is a block diagram illustrating a terminal according to further another embodiment.

FIG. 12 a block diagram illustrating a terminal according to further another embodiment.

Referring to FIG. 12, the terminal may comprise a receiver 1201 and a decoder 1202.

The receiver 1201 receives a signal including the control information channel from the transmitting apparatus and extracts the value of the RIV from the resource allocation information field in the control information channel. In example of FIG. 12, The control information channel may be the compact PDCCH, the indicating PDCCH, the E-PDCCH and the PDCCH for the MTC terminal. The RIV may include one of the PDSCH, the PUSCH, the E-PDCCH, and the E-PDCCH search space.

The decoder 1203 decodes the value of the RIV and extract the length of the allocated resource L and an offset thereof j. The decoder 1203 may know information on the resource for at least one of the PDSCH, the PUSCH, the E-PDCCH and the E-PDCCH search space.

Figure 13:
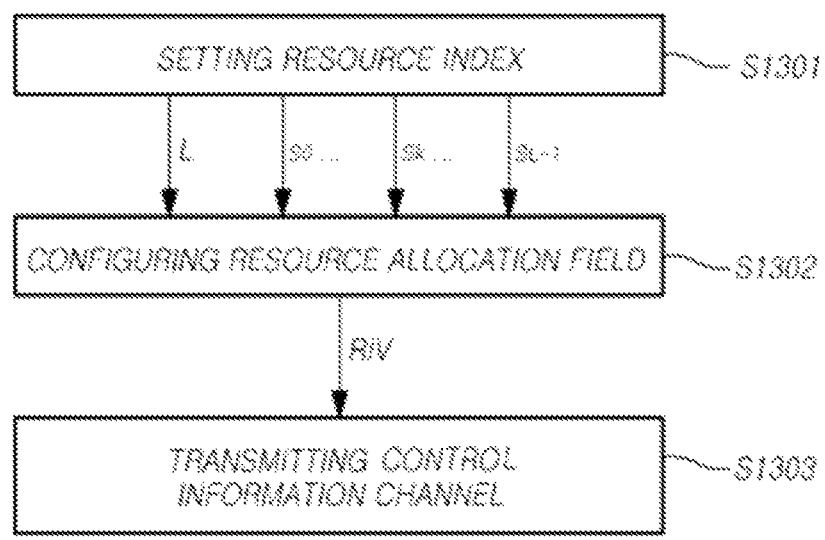
FIG. 13 is a flowchart illustrating a method to allocate a resource for a transmitting apparatus according to further another embodiment of the present invention.

FIG. 13 is a flowchart illustrating a method to allocate a resource for a transmitting apparatus according to further another embodiment of the present invention.

Referring to FIG. 13, the transmitting apparatus sets the index of the resource allocated in the data region at S1301. The allocated resource may be a resource to which the PDSCH or the PUSCH is allocated in FIG. 2 and the E-PDCCH is allocated in FIG. 5A or the E-PDCCH search space is allocated in FIG. 5B.

The length of the allocated resource, namely a resource blocks or block groups, may be limited to less than the maximum value $L_{max}$. For example, the length of the allocated resource may be limited in case of at least one of the compact PDCCH which is shorter than the conventional PDCCH, the indicating PDCCH which indicates either the E-PDCCH or the E-PDCCH search space, the E-PDCCH and the PDCCH which indicates the data region of the MTC terminal as the control information channel.

The maximum value $L_{max}$ of the length of the allocated resource may be predefined. As one example, when the terminal communicating with the transmitting apparatus is the MTC terminal, the length of the allocated resource L may be limited within the predefined maximum value $L_{max}$. As other example, when the transmitted control channel is one of the compact PDCCH, the indicating PDCCH and the E-PDCCH, the length of the allocated resource L may be limited within the predefined maximum value $L_{max}$.

The maximum value $L_{max}$ of the length of the allocated resource may be transmitted through the higher layer signaling such as RRC (Radio Resource Control).

Next, the transmitting apparatus consists of the resource allocation field using the length of the allocated resource L and the index of each allocated resource at S1302. As one example, the resource allocation field may include the first field consisting of the length of the allocated resource L and the second field consisting of the calculated with the index of each allocated resource by the formula 3. As other example, the resource allocation field may consist of the length of the allocated resource L allocated by the formula 4 and the RIV calculated with the index of each allocated resource by the formula 3.

Further the resource allocation information comprised in the resource allocation field is transmitted at S1303.

Meanwhile, the control information channel may be the compact PDCCH which includes the resource allocation information of the PDSCH or the PUSCH and have the compressed length shorter than the conventional PDCCH. The compact PDCCH and the conventional PDCCH may be transmitted under the newly defined transmission mode. The transmitting apparatus may transmit, to the terminal, the configuration information on which of the compact PDCCH and the conventional PDCCH will be transmitted before transmitting the PDCCH to the terminal. The compact PDCCH and the conventional PDCCH also have the different length and the terminal may identify the kind of the PDCCH from the length thereof and extract the allocation information of the PDSCH or the PUSCH.

The control information channel may be the indicating PDCCH which includes the resource allocation information to indicate either the E-PDCCH or the E-PDCCH search space. The indicating PDCCH may include control information such as MCS, MIMO scheme and the like related to the resource allocation information of either the E-PDCCH or the E-PDCCH search space. The indicating PDCCH and the conventional PDCCH may be transmitted under the newly defined transmission mode. The transmitting apparatus may transmit, to the terminal, the configuration information on which of the indicating PDCCH and the conventional PDCCH will be transmitted before transmitting the PDCCH to the terminal. The indicating PDCCH and the conventional PDCCH also have the different length and the terminal may identify the kind of the PDCCH from the length thereof and extract the allocation information of the PDSCH or the PUSCH.

The control information channel may be the E-PDCCH located in the E-PDCCH search space. The configuration information for the E-PDCCH search space may be transmitted from the transmitting apparatus to the terminal through the indication PDCCH or the higher layer signaling. The E-PDCCH located In the E-PDCCH search space in FIG. 5B may have the compressed length shorter than the E-PDCCH in FIG. 5A directly indicated by the conventional PDCCH and/or the indicating PDCCH. The transmitting apparatus may transmit, to the terminal, the configuration information on which of the compact PDCCH with the compressed length and the conventional PDCCH with the not-compressed length will be transmitted.

The control information channel may be the PDCCH which includes the resource allocation information for of the PDSCH or the PUSCH transmitted to the MTC terminal. The PDCCH transmitted to the MTC terminal may have the compressed length shorter than the PDCCH transmitted to the general terminal. The transmitting apparatus may know that the terminal receiving the PDCCH is the MTC terminal and transmit the PDCCH with the compressed length. The transmitting apparatus may also transmit, to the terminal, the configuration information on which of the PDCCH with the compressed length and the conventional PDCCH will be transmitted before transmitting the PDCCH to the terminal. The PDCCH with the compressed length and the conventional PDCCH also have the different length and the terminal may identify the kind of the PDCCH from the length thereof and extract the allocation information of the PDSCH or the PUSCH.

Figure 14:
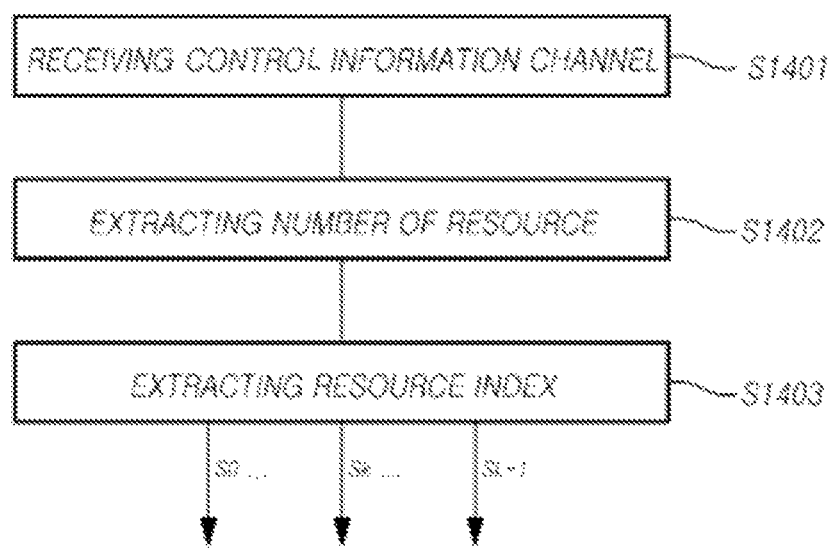
FIG. 14 is a flowchart illustrating a method to allocate a resource for a terminal according to further another embodiment of the present invention.

FIG. 14 is a flowchart illustrating a method to allocate a resource for a terminal according to further another embodiment of the present invention.

The terminal receives the control information channel from the transmitting apparatus at S1401. The received control information channel may be the compact PDCCH, the indicating PDCCH, the E-PDCCH and the PDCCH for the MTC terminal. Further the terminal extracts the length L from the resource allocation information field at first at S1402 and then the index of each allocated resource at S1403. The allocated resource may be the resource for at least one of the PDSCH, the PUSCH, the E-PDCCH and the E-PDCCH search space.

Figure 15:
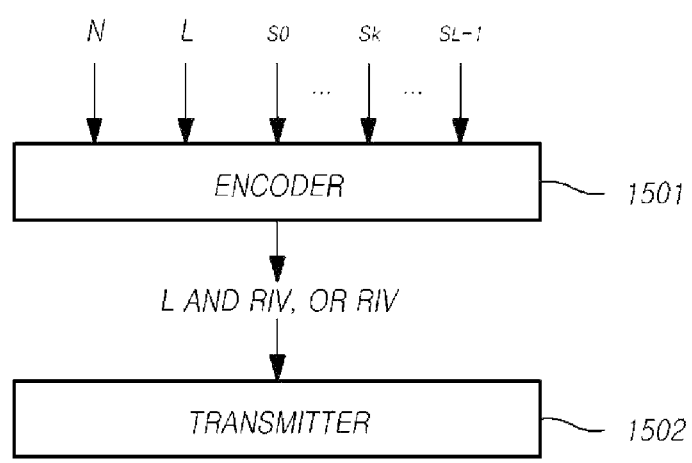
FIG. 15 is a block diagram illustrating a transmitting apparatus according to further another embodiment.

FIG. 15 is a block diagram illustrating a transmitting apparatus according to further another embodiment.

Referring to FIG. 15, the transmitting apparatus may comprise an encoder 1501 and the transmitter 1502.

The encoder 1501 receives information on the total number of the resource block or block group N, the length of the cluster L and the index of each allocated resource sk($0 \leq k \leq L-1$) and calculates the value of the RIV which will is input in the resource allocation field based on them. As one example, the resource allocation field may include the first field consisting of the length of the allocated resource L and the second field consisting of the RIV calculated by the formula 3. As other example, the value which will be included in the resource allocation field may be the RIV calculated by the formula 4. The resource blocks or blocks group may be the resource blocks or block groups to which at least one of the PUSCH, the E-PDCCH and the E-PDCCH search is allocated.

The transmitter 1502 may transmit the DCI including the resource allocation field through the control information channel. The control information channel may be the compact PDCCH, the indicating PDCCH, the E-PDCCH and the PDCCH for the MTC terminal.

Figure 16:
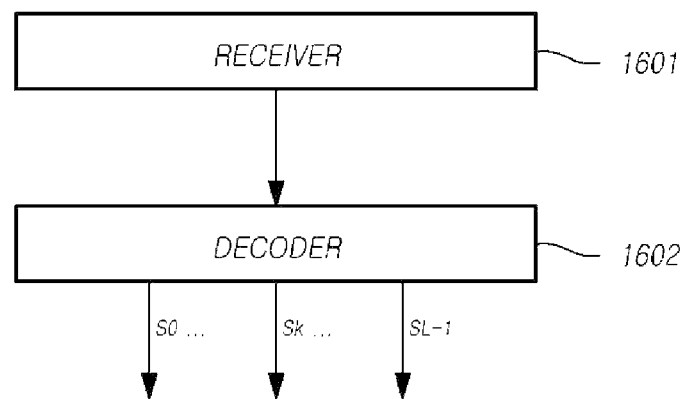
FIG. 16 is a block diagram illustrating a terminal according to further another embodiment.

FIG. 16 a block diagram illustrating a terminal according to further another embodiment.

Referring to FIG. 16, the terminal may comprise a receiver 1601 and a decoder 1602.

The receiver 1601 receives a signal including the control information channel from the transmitting apparatus and extracts the value input to the resource allocation field in the control information channel. In example of FIG. 12, The control information channel may be the compact PDCCH, the indicating PDCCH, the E-PDCCH and the PDCCH for the MTC terminal. The RIV may include one of the PDSCH, the PUSCH, the E-PDCCH, and the E-PDCCH search space.

The decoder 1603 decodes the value input to the resource allocation field and extracts the index of the resource block or block group. At first the decoder 1603 extracts the length L of the resource blocks or block groups and then the index of the resource blocks or block groups by using it. Finally the decoder 1603 may know information on the resource for at least one of the PDSCH, the PUSCH, the E-PDCCH and the E-PDCCH search space.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A transmitting apparatus comprising:
a encoder to generate resource allocation information (RIV) converted from the length of a resource allocation region L and an offset thereof j, wherein the resource allocation region consists of contiguous resource blocks or block groups; and
a transmitter to transmit the resource allocation information to a terminal,
wherein the resource allocation information is calculated by the formula below, $$RIV = (L-1)(N+1) - \frac{L(L-1)}{2} + j,$$
$$j = 0, \ldots, N-L, 0 < L \leq L_{max},$$
OR
$$RIV = (L-1)N - \frac{(L-1)(L-2)}{2} + j,$$
$$j = 0, \ldots, N-L, 0 < L \leq L_{max}$$

wherein N is a number of entire resource blocks or block groups and $L_{max}$ is a maximum value of the length of the resource allocation region.

2. The transmitting apparatus as claimed in claim 1, wherein the resource allocation information is transmitted through RRC (Radio Resource Control).

3. A method for allocating a resource, the method comprising:
generating resource allocation information (RIV) converted from the length of a resource allocation region L and an offset thereof j, wherein the resource allocation region consists of contiguous resource blocks or block groups; and
transmitting the resource allocation information to a terminal,
wherein the resource allocation information is calculated by the formula below, $$RIV = (L-1)(N+1) - \frac{L(L-1)}{2} + j,$$
$$j = 0, \ldots, N-L, 0 < L \leq L_{max},$$
OR
$$RIV = (L-1)N - \frac{(L-1)(L-2)}{2} + j,$$
$$j = 0, \ldots, N-L, 0 < L \leq L_{max}$$

wherein N is a number of entire resource blocks or block groups and $L_{max}$ is a maximum value of the length of the resource allocation region.

4. The method as claimed in claim 3, wherein the resource allocation information is transmitted through RRC (Radio Resource Control).

5. A terminal comprising:
a receiver to receive resource allocation information (RIV) to which information about a resource allocation region is encoded, wherein the resource allocation region consists of contiguous resource blocks or block groups; and
a decoder to decode the resource allocation information so as to extract a length of a resource allocation region L and an offset thereof j,
wherein the resource allocation information is calculated by the formula below, $$RIV = (L-1)(N+1) - \frac{L(L-1)}{2} + j,$$
$$j = 0, \ldots, N-L, 0 < L \leq L_{max},$$
OR
$$RIV = (L-1)N - \frac{(L-1)(L-2)}{2} + j,$$
$$j = 0, \ldots, N-L, 0 < L \leq L_{max}$$

wherein N is a number of entire resource blocks or block groups and $L_{max}$ is a maximum value of the length of the resource allocation region.

6. The terminal as claimed in claim 5, wherein, the resource allocation information is transmitted through RRC (Radio Resource Control).

7. A method for receiving a resource allocation information, the method comprising:
receiving resource allocation information (RIV) to which information about a resource allocation region is encoded, wherein the resource allocation region consists of contiguous resource blocks or block groups; and
decoding the resource allocation information so as to extract a length of a resource allocation region L and an offset thereof j,
wherein the resource allocation information is calculated by the formula below, $$RIV = (L-1)(N+1) - \frac{L(L-1)}{2} + j,$$
$$j = 0, \ldots, N-L, 0 < L \leq L_{max},$$
OR -continued $$RIV = (L-1)N - \frac{(L-1)(L-2)}{2} + j,$$
$$j = 0, \ldots, N-L, 0 < L \le L_{max}$$

wherein N is a number of entire resource blocks or block groups and $L_{max}$ is a maximum value of the length of the resource allocation region.

8. The method as claimed in claim 7, wherein the resource allocation information is transmitted through RRC (Radio Resource Control).

* * * * *